June 28, 1938.  E. E. KUEHL  2,121,968
FISH LADDER
Filed June 10, 1936

Inventor.
E. E. Kuehl
By Arthur A. Sturges
Attorney

Patented June 28, 1938

2,121,968

UNITED STATES PATENT OFFICE 2,121,968

FISH LADDER

Edward E. Kuehl, Verdigre, Nebr.

Application June 10, 1936, Serial No. 84,430

7 Claims. (Cl. 61—21)

This invention relates to fish ladders and has for an object to provide means whereby fish may elevate themselves over artificial dams placed in flowing streams.

Another object of the invention is to provide a fish ladder having an extensible water intake which is adapted to be adjusted for accommodating variations of the water level at the up stream side of a dam during rainy and drouth seasons of the year.

A still further object of the invention is to provide a fish ladder having an extensible and swingable water discharge conduit at the down stream side of a dam which may be selectively positioned in a portion of a stream where fish habitually congregate for the intake of fish.

A further object of the invention is to provide a syphon operated fish ladder adapted to apply suction for the removal of air from the ladder for insuring that fish will be in their natural element at all times during an ascent or descent thereof.

Another object of the invention is to provide a fish ladder having corrugations or the like upon the interior surfaces thereof for causing the descending current of water adjacent said surfaces to form eddies whereby portions of said current are of less force than the main body portion thereof for assisting particularly the weaker and less agile species of fish during an ascent of the ladder.

An important object of the invention is to provide a fish ladder having rest pockets whereby a weakened fish after having ascended one step of the ladder may become swept into or readily enter a rest pocket of still water by the rush of the descending current, providing opporunity for a weak fish to recuperate its strength before ascending the next step of the ladder and entering a succeeding rest pocket or compartment.

A still further important object of the invention is to provide means whereby the direction of the flowing water is frequently reversed during its passage through the ladder for decreasing the velocity thereof for the purpose of assisting an ascent of fish therethrough, said reversal occurring preferably twice adjacent and for each step of the ladder.

With the foregoing and other objects in view the invention will be more fully described hereinafter and more particularly pointed out in the claims appended hereto.

In the drawing, wherein like symbols refer to like or corresponding parts throughout the several views.

Figure 1:
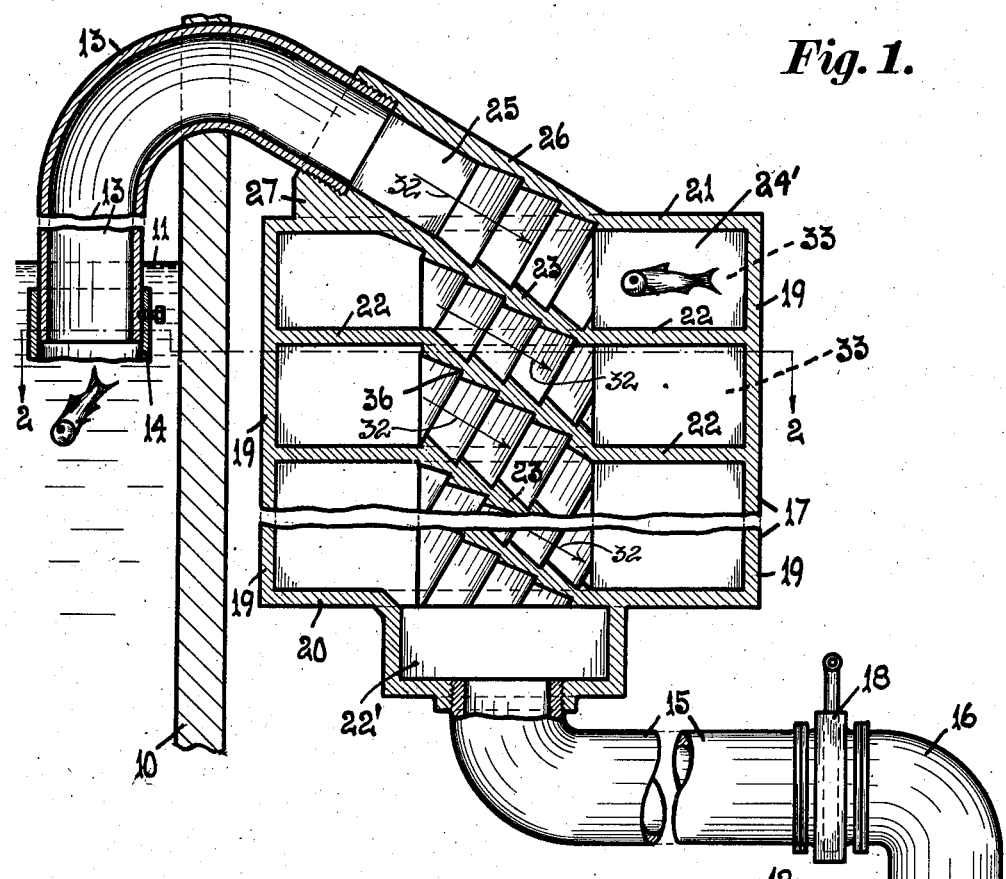
Figure 1 is a vertical section, partly in side elevation of a fish ladder and dam embodying the present invention, the view being taken substantially on line 1—1 of Figure 2.

As heretofore practiced in the art various expedients have been provided for assisting fish past natural water falls and artificial dams which are impractical especially in instances where dams are of comparatively great height, such dams prohibiting the salmon and other fish from reaching the head waters of rivers for spawning and propagating purposes. It is well known that a salmon in particular returns to the location of its birth to spawn. The said river is a major factor of the salmon industry of this country. Such dams which are comparatively close to the mouth of rivers are detrimental to said industry and the present invention comprehends the provision of means for directing salmon past high dams in particular as well as other similar fish travel obstructions.

Referring now to the drawing for a more particular description, 10 indicates a dam; 11 the level of water at the up stream side of the dam and 12 the level thereof at the down stream side of the dam.

The fish ladder of the present invention preferably includes a water intake conduit 13 extending over or through the wall of the dam 10 and having an extensible sleeve 14 which may be elevated or lowered in accordance with the level 11 of the water to accommodate changes in said level during drier seasons of lesser water supply and the like.

The lower end of the fish ladder is preferably provided with a water outlet conduit 15 which is suitably secured preferably by means of screw threads to the bottom of the ladder as shown in Figure 1 and in a manner to permit horizontal swinging movements thereof, said conduit 15 being of a selected length in accordance with the width of a stream whereby the discharge nozzle 16 may be positioned vertically with respect to a deep hole or place where it is natural for fish to congregate in a stream and walls may be placed in said stream which converge toward said nozzle for directing fish to the latter.

If desired, the nozzle 16 may be provided with an extensible member similar to the member 14 at the end of the intake conduit 13 which may be extended to the bottom of said place of congregation of the fish from time to time for encouraging fish which naturally inhabit the bottom of a stream to enter the fish ladder and at other times by positioning the nozzle or its extension adjacent the surface or water level 12 for the accommodation of fish which normally remain close to the surface of the water, said sleeve being not necessarily employed in instances where a certain stream contains but one type of fish. The main body portion of the fish ladder 17 is provided with water tight enclosing walls which are also preferably airtight and between the members 15 and 16 a gate valve 18 is preferably provided.

The gate valve 18 is initially closed and the ladder filled full of water by manual operation or by means of a power driven pump. The member 13 may be temporarily removed for this purpose or the initial water poured into the ladder through a suitable orifice, not shown, adjacent the upper end of the ladder. When filled with water the gate valve 18 is opened or a similar plug removed from the bottom of the ladder, the latter being normally open at all times during operation and when opened the water rushing out from the nozzle 16 causes a suction to be applied to the water adjacent the water level 11, syphoning water over the dam 10 and ultimately drawing air out of the several compartments, chambers and passageways of the ladder.

The main body portion 17 of the ladder includes outer enclosure walls or side walls 19 which may be vertically disposed and are preferably arranged rectangular in plan, said walls being of any desired height. Said body further includes a bottom 20 and a top or roof member 21.

The last upward incline or step of the ladder may project through the top or roof 21 and is connected to the water intake conduit 13. The bottom 20 is in communication with a sump 22', the latter in turn being in communication with the conduit 15. The sump provides a convenient place to attach the conduit 15 and may otherwise be dispensed with.

It will be understood that, if desired, the heretofore mentioned conduits, sleeves and nozzle may be provided with the later mentioned rest pockets and corrugated surfaces if desired and that the pockets and corrugated surfaces are depicted on the main body portion of the ladder for convenience of illustration.

Also the exterior walls and other parts may, if desired, be provided with glass portions of sufficient strength to withstand the water pressure and so arranged that light is diffused and distributed within the ladder in a manner to encourage the fish to swim upwardly thereof, said transparent members not being illustrated.

The interior of the main body portion of the ladder is provided with a plurality of floors 22 which are substantially or preferably horizontally disposed.

Adjacent the medial portion of each floor 22 and the top and bottom members 21 and 20 an opening is provided, and from the edge of the opening of a higher floor to the edge of an opening of a lower floor downwardly inclined steps 23 are provided having side walls 24 providing a downwardly inclined conduit or passage-way from one floor to another. Side walls 25 are provided for the intake conduit 13 which merge into the adjacent side walls 24 and extend from the adjacent steps 23 to an inclined top wall 26, the whole providing a top connection 27 for the conduit 13.

Figure 2:
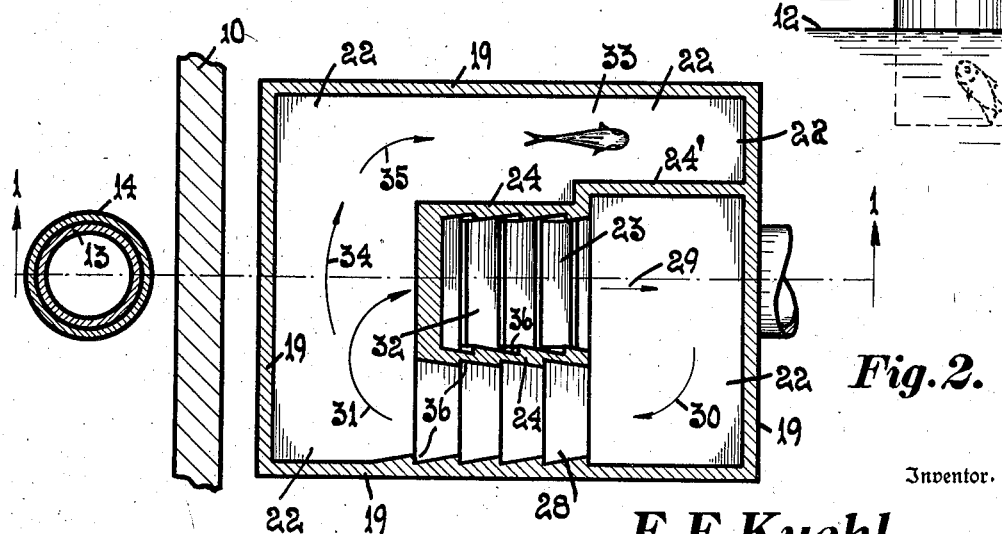
Figure 2 is a transverse section taken on line 2—2 of Figure 1.

As best shown in Figure 2, between a side wall 24 of each step 23 and an outer wall 19 of the housing or main body portion of the ladder, a horizontal laterally offset space or duct 28 is provided in conjunction with adjacent upper and lower floors 22, whereby water descending a step 23 in the direction of the arrow 29 upon reaching a lower floor 22 turns in the direction of the arrow 30 through a duct 28 and moves in the direction of the arrow 31 into a next succeeding lower downwardly inclined passage-way 32 provided between two steps 23 and their side walls 24. By this means the water descends through the ladder spirally, being guided by said walls, floors and steps and it will be noted that the direction of flow is substantially spiral; flowing downwardly through the passages 32 in one direction and then backwardly in an opposite direction through the horizontal passages 28.

Oppositely disposed with respect to each duct 28 rest pockets or compartments 33 are provided which are in communication with the descending water. The rest pockets provide comparatively calm or still water since they are enclosed on five sides and open at but one side or end, said enclosing members include oppositely disposed floors 22, two outer side walls 19 of the housing and an inner wall 24 having an extension thereof 24' which is joined to an outer wall 19 and it will be understood that as the current or flow of water leaves a duct 28 in the direction of the arrow 31 that some of said water moves in the direction of the arrows 34 and 35 towards the rest pockets 33, maintaining water in the latter whereby a fish swimming upwardly of a step in a direction opposite to the arrow 29 upon reaching the level of a floor 22 may follow the lines of least resistance in the direction of the arrows 34 and 35 and enter a rest pocket 33 while recuperating its strength before swimming against the current and upwardly of the next succeeding step, the movement of water toward and into the mouth of said pocket and in the direction of the arrows 34 and 35 directing the fish to the pocket or in the case of weakened fish forcing, sweeping or assisting such fish into said pocket.

The steps 23 and the ducts or passages 28 have, in their confining walls, transverse ridges, corrugations or stepped portions 36 which cause ripples or eddies in the downwardly flowing current of water, said eddies assisting the weaker fish which choose to proceed upwardly of the ladder among said eddies to ascend each step of the ladder.

It will be noted that I have provided a fish ladder having parts disposed between the water inlet and outlet thereof which are adapted to decrease the velocity of water flowing from said inlet to said outlet, said parts being so arranged as to provide a continuous passage-way, portions of which are offset or disposed in angular relationship with respect to other portions of the passageway whereby the water is prevented from flowing continuously in one direction without meeting an obstruction or member arranged to change the direction of flow of said water.

It is obvious that various changes and modifications may be made in the details of construction and design of the above specifically described embodiment of my invention without departing from the spirit thereof, such changes and modifications being restricted only by the scope of the claims.

I claim:—

1. A fish ladder comprising a roof, bottom and side walls providing an enclosed housing having an inlet and an outlet for water, a plurality of floors within the housing for providing a plurality of chambers between said floors, and interior divisional walls and steps within the housing providing inclined passageways extending between said floors from one chamber to another, said chambers in communication with said inlet and outlet.

2. A fish ladder comprising an enclosed housing, a plurality of floors within the housing for providing a chamber between said floors, said floors each having an opening therethrough, a step extending inclined with respect to the floors from the edge of the opening of one floor to a next adjacent floor, walls at the side edges of said steps for providing inclined passageways between said steps, said walls in conjunction with the walls of the housing and said floors providing ducts whereby said passageways are in communication with each other, and an extension of one of the walls of each passageway disposed between said floors and abutting a wall of the housing for providing a rest pocket for each floor, said housing having an inlet and an outlet for water in communication with the passageways, ducts and rest pockets.

3. A fish ladder comprising a housing having an inlet and an outlet for water, said housing having a plurality of floors for providing chambers within said housing, divisional walls within said chambers, and inclined members abutting said walls for providing passageways inclined with respect to the side walls of said housing, said passageways extending from one chamber to another and in communication with said inlet and outlet, the surfaces of said divisional walls and inclined members forming said passageways provided with corrugations adapted to provide eddies in a current of water flowing through said passageways from said inlet toward said outlet.

4. A fish ladder comprising a housing adapted to be disposed substantially in vertical parallelism with respect to the wall of a stream dam, said housing having a water intake and outlet respectively at its ends, spaced apart horizontally disposed floors in said housing for providing a plurality of chambers one above another, said floors having openings, members downwardly inclined with respect to said floors, one of said members extending from the edge of the opening of each floor to the edge of the opening of each lower floor, walls abutting the sides of said inclined members for providing a passageway extending from one floor to another through each chamber, an extensible conduit in communication with said housing intake having a portion adapted to be disposed above the water level at the upstream side of the dam, said extensible conduit having a free end adapted to be disposed below the level of the water at said side of the dam, and a swingable conduit provided with a free end in communication with said intake, chambers and passageways, said end adapted to be positioned below the level of the water at the downstream side of said dam for syphoning water through the fish ladder.

5. A fish ladder for a stream dam comprising an enclosed housing provided with an inlet and an outlet for water, means in said housing disposed between the inlet and outlet to provide a continuous tortuous passageway, a swingable discharge conduit connected to said outlet having a free end, said end adapted to be positioned in selected portions of the water at the downstream side of said dam, and means for directing water to said inlet at the upstream side of said dam.

6. A fish ladder, comprising a housing having an inlet for water at its upper end and an outlet for water at its lower end for downward flow of water through the housing, said housing having spaced apart horizontal partitions therein dividing the housing into superposed chambers, a central enclosure disposed in the housing intersecting the partitions and having inclined passages therein opening at opposite ends into adjacent superposed chambers, said enclosure being spaced from the walls of the housing to provide horizontal passages therebetween intercommunicating the opposite ends of adjacent inclined passages of the enclosure.

7. A fish ladder comprising an enclosed housing with an inlet and an outlet for water, the said housing having a plurality of horizontally spaced chambers with angularly disposed guideways adjoining adjacent chambers to provide a continuous tortuous runway between the upper and the lower chambers, and a conduit connected with the inlet and the outlet for directing the flow of water to be passed through the runway.

EDWARD E. KUEHL.